US012495686B2

(12) United States Patent
Morino et al.

(10) Patent No.: US 12,495,686 B2
(45) Date of Patent: Dec. 9, 2025

(54) DISPLAY ASSEMBLY AND ELECTRONIC APPARATUS

(71) Applicant: Lenovo (Singapore) Pte. Ltd., Singapore (SG)

(72) Inventors: Takayuki Morino, Kanagawa (JP); Shigehiro Horiuchi, Kanagawa (JP); Takehito Yamauchi, Kanagawa (JP); Hiroaki Kinoshita, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 430 days.

(21) Appl. No.: 18/170,110

(22) Filed: Feb. 16, 2023

(65) Prior Publication Data

US 2023/0292565 A1 Sep. 14, 2023

(30) Foreign Application Priority Data

Mar. 11, 2022 (JP) ................ 2022-038242

(51) Int. Cl.
*H10K 59/131* (2023.01)
*H10K 77/10* (2023.01)
*H10K 102/00* (2023.01)

(52) U.S. Cl.
CPC ......... *H10K 59/131* (2023.02); *H10K 77/111* (2023.02); *H10K 2102/311* (2023.02)

(58) Field of Classification Search
CPC .............. H10K 59/131; H10K 77/111; H10K 2102/311; G06F 1/1616; G06F 1/1652; G06F 1/1681; H04M 1/0268; H04M 1/0214
See application file for complete search history.

(56) References Cited

U.S. PATENT DOCUMENTS

| | | |
|---|---|---|
| 2014/0307396 A1 | 10/2014 | Lee |
| 2015/0021570 A1 | 1/2015 | Kim et al. |
| 2016/0064466 A1 | 3/2016 | Son et al. |
| 2017/0237027 A1* | 8/2017 | Lee .......... H10K 59/40 257/40 |
| 2017/0338294 A1 | 11/2017 | Choi et al. |
| 2019/0350081 A1 | 11/2019 | Park et al. |
| 2020/0163231 A1 | 5/2020 | Park |
| 2024/0276810 A1* | 8/2024 | Tian .......... H10K 59/131 |

FOREIGN PATENT DOCUMENTS

| | | |
|---|---|---|
| JP | 2017-111437 A | 6/2017 |
| JP | 2019-159313 A | 9/2019 |
| JP | 2020-126109 A | 8/2020 |
| JP | 6950044 B1 | 10/2021 |
| JP | 2021-196760 A | 12/2021 |

* cited by examiner

*Primary Examiner* — J. E. Schoenholtz
(74) *Attorney, Agent, or Firm* — Osha Bergman Watanabe & Burton LLP

(57) ABSTRACT

A display assembly includes: a display body that is formed in a flexible sheet shape, and includes an active region and a non-active region; a plate that is disposed on a side of a rear surface of the display body, and supports the display body on a first surface; a control board that performs display control of the display body; and a wire that connects the display body and the control board. The display body has an extended portion that extends a part of the non-active region, and a folded portion that is provided in a middle of the extended portion and folded back so as to wrap around an end surface of the plate.

9 Claims, 9 Drawing Sheets

DISPLAY ASSEMBLY AND ELECTRONIC APPARATUS

CROSS-REFERENCE TO RELATED APPLICATIONS

This application claims priority to Japanese Patent Application No. 2022-38242 filed on Mar. 11, 2022, the contents of which are hereby incorporated herein by reference in their entirety.

TECHNICAL FIELD

The present invention relates to a display assembly and an electronic apparatus.

BACKGROUND

The present applicant has proposed a display assembly having a configuration in which a control board of a display is connected to a display body using a flexible board (see Japanese Patent Publication No. 6950044).

In the configuration of Japanese Patent Publication No. 6950044, the flexible board, which is a wire that connects the display body to the control board, is folded to pass through an end surface of a plate that supports the display body and a rear surface of the display body, and is connected to the control board.

For this reason, in the configuration, an entire non-active region is disposed on a front surface of the display assembly. As a result, in the configuration, a width of a bezel member surrounding a periphery of the display increases, and there is room for improvement in terms of appearance quality.

Furthermore, in the configuration, ACF bonding, which is a connecting portion between the display body and the flexible board, is disposed on a front surface of the display. For this reason, the bezel member is adhesively fixed onto the ACF bonding. As a result, in the configuration, when the display is removed for maintenance or the like and the bezel member is peeled off, there is a problem in that the ACF bonding is destroyed.

SUMMARY

One or more embodiments of the present invention provide a display assembly and an electronic apparatus capable of suppressing a bezel width, and preventing a connecting portion of a wire from being destroyed when maintenance is performed.

A display assembly according to one or more embodiments of the present invention includes: a display body that is formed in a flexible sheet shape, and includes an active region and a non-active region; a plate that is disposed on a side of a rear surface of the display body, and supports the display body on a first surface; a control board that performs display control of the display body; and a wire that connects the display body and the control board, in which the display body has an extended portion that extends a part of the non-active region, and a folded portion that is provided in a middle of the extended portion and folded back so as to wrap around an end surface of the plate, and the wire is connected to an end portion of the extended portion so that a connecting portion between the extended portion and the wire is disposed on a side of a second surface of the plate.

An electronic apparatus according to one or more embodiments of the present invention includes: a chassis member; a display assembly supported by the chassis member, in which the display assembly includes a display body that is formed in a flexible sheet shape, and includes an active region and a non-active region, a plate that is disposed on a side of a rear surface of the display body by being fixed to the chassis member, and supports the display body on a first surface, a control board that performs display control of the display body, and a wire that connects the display body and the control board, the display body has an extended portion that extends a part of the non-active region, and a folded portion that is provided in a middle of the extended portion and folded back so as to wrap around an end surface of the plate, and the wire is connected to an end portion of the extended portion so that a connecting portion between the extended portion and the wire is disposed on a side of a second surface of the plate.

The above-described embodiments of present invention can suppress a bezel width, and prevent a connecting portion of a wire from being destroyed when maintenance is performed.

DETAILED DESCRIPTION

A display assembly and an electronic apparatus according to one or more embodiments of the present invention will be described below with reference to the accompanying drawings.

Figure 1:
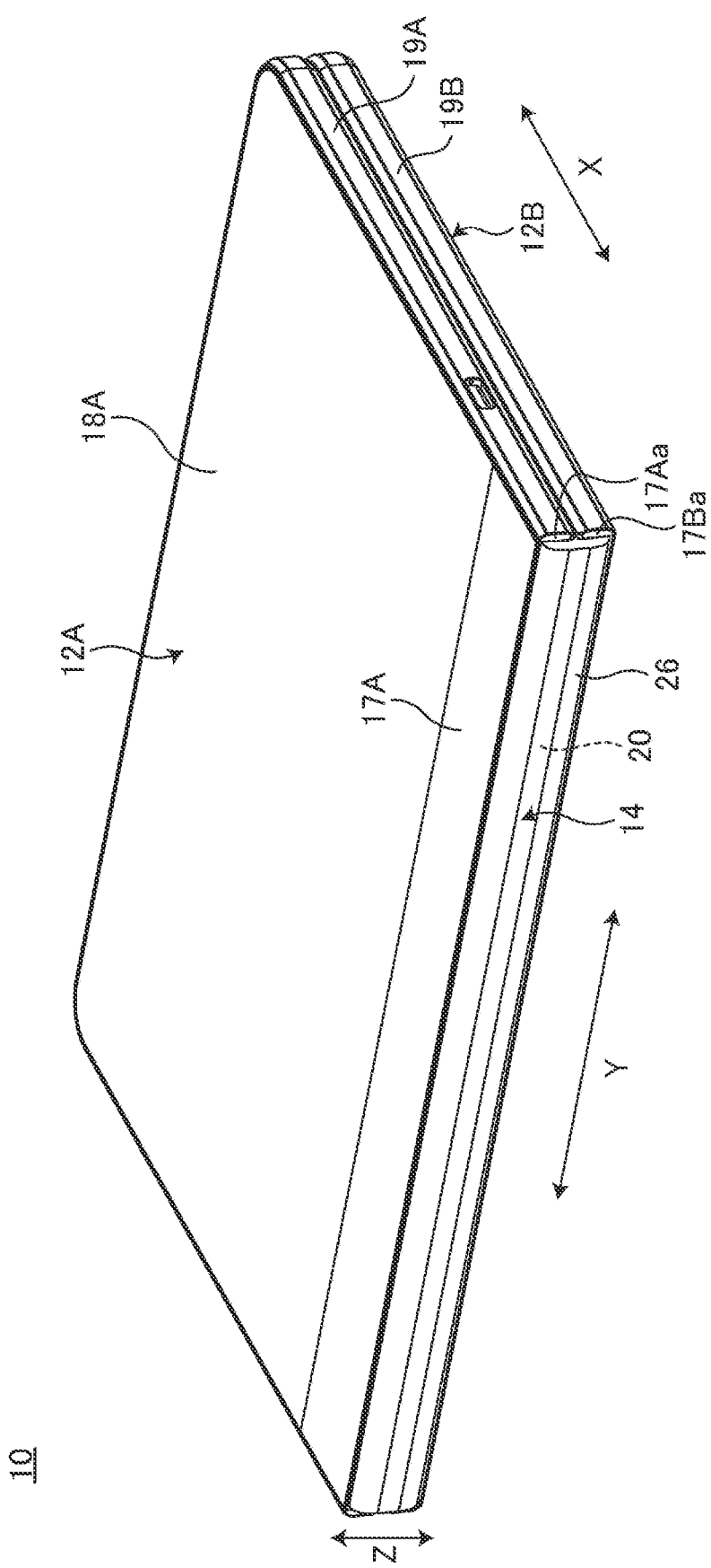
FIG. 1 is a perspective view schematically illustrating a state in which an electronic apparatus according to one or more embodiments is closed and in a 0-degree posture.
Figure 2:
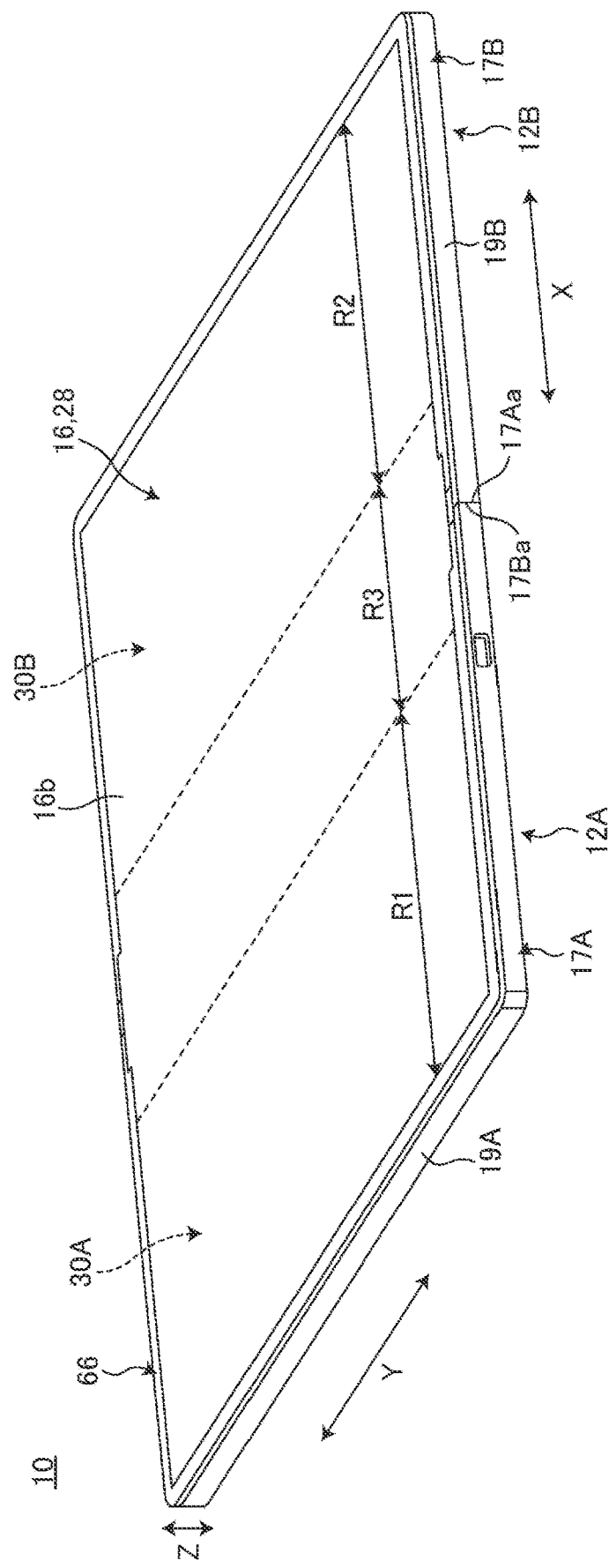
FIG. 2 is a perspective view schematically illustrating a state in which the electronic apparatus illustrated in FIG. 1 is opened and in a 180-degree posture.
Figure 3:
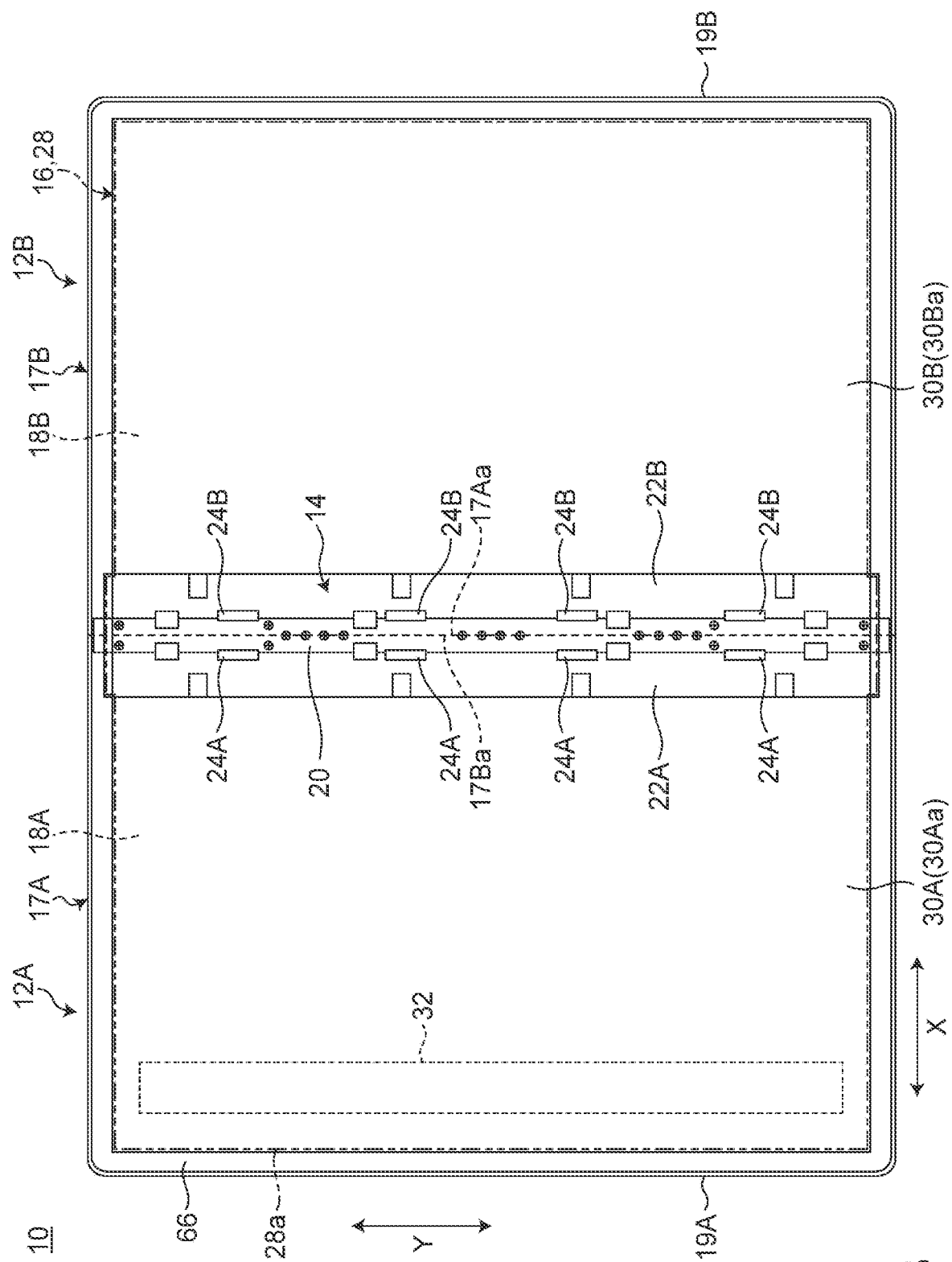
FIG. 3 is a plan view schematically illustrating an internal structure of the electronic apparatus illustrated in FIG. 2.

FIG. 1 is a perspective view schematically illustrating a state in which an electronic apparatus 10 according to one or more embodiments is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis member 12A and a second chassis member 12B, a hinge device 14, and a display assembly 16. The electronic apparatus 10 of one or more embodiments of the present embodiment exemplifies a tablet PC or a notebook PC that is capable of being folded like a book. The electronic apparatus 10 may be a smartphone, a portable game machine, or the like.

Each of the chassis members 12A and 12B is disposed adjacent to each other. The first chassis member 12A includes a first frame member 17A and a first rear surface plate 18A. The first frame member 17A is a rectangular frame-shaped member having standing walls 19A formed on three sides other than the edge portion 17Aa adjacent to the second chassis member 12B. The first rear surface plate 18A is a plate-shaped member that closes the rear surface opening of the first frame member 17A (see also FIG. 6). Similarly, the second chassis member 12B includes a second frame member 17B that has standing walls 19B formed on three sides other than the edge portion 17Ba adjacent to the first chassis member 12A, and a second rear surface plate 18B that closes the rear surface opening of the second frame member 17B. The front surface openings of the frame members 17A and 17B are closed with the display assembly 16.

Each of the members 17A, 17B, 18A and 18B is made of, for example, a metal member such as stainless steel, magnesium, or aluminum, or a fiber-reinforced resin plate containing reinforcing fibers such as carbon fiber, and the like.

A hinge device 14 connects the chassis members 12A and 12B so as to be relatively rotatable. The hinge device 14 also functions as a rear cover that hides the gap between the edge portions 17Aa and 17Ba formed in the 0-degree posture illustrated in FIG. 1. The display assembly 16 extends over the chassis members 12A and 12B.

Hereinafter, as for the electronic apparatus 10, description is performed while the direction in which the chassis members 12A and 12B are arranged is called an X direction, the direction along the edge portions 17Aa and 17Ba orthogonal to the X direction is called a Y direction, and the thickness direction of the chassis members 12A and 12B is called a Z direction. As for the angular posture between the chassis members 12A and 12B, description is performed while a state in which the chassis members 12A and 12B are laminated so as to overlap each other in the surface normal direction is called the 0-degree posture (see FIG. 1), and a state in which the chassis members 12A and 12B are aligned in a direction perpendicular to the surface normal direction (X direction) is called the 180-degree posture (see FIG. 2). It is possible to call the posture between 0 and 180 degrees by appropriately carving the angle. For example, a state in which the surface normal directions of the chassis members 12A and 12B are orthogonal to each other is a 90-degree posture. These angles are for convenience of description, and the actual product may of course have angular positions slightly deviated from the exact angular positions indicated by angle numbers.

As illustrated in FIG. 3, the hinge device 14 of one or more embodiments has a hinge main body 20, support plates 22A and 22B, and a plurality of link arms 24A and 24B.

The hinge main body 20 is provided at a position straddling the edge portions 17Aa and 17Ba of the chassis members 12A and 12B, and extends over the substantially entire length in the Y direction along the edge portions 17Aa and 17Ba. The hinge main body 20 is a block-shaped component formed of a metal material such as aluminum. The hinge main body 20 supports two hinge shafts aligned in the X direction in the 180-degree posture. A plurality of link arms 24A aligned in the Y direction are pivotally supported on one hinge shaft, and a plurality of link arms 24B aligned in the Y direction are pivotally supported on the other hinge shaft. Each link arm 24A is pivotally supported by a bracket fixed to the first frame member 17A. Each link arm 24B is pivotally supported by a bracket fixed to the second frame member 17B.

As a result, the hinge main body 20 connects the chassis members 12A and 12B so as to be relatively rotatable. A gear mechanism for synchronizing the rotational movement between the chassis members 12A and 12B and a torque mechanism for applying a predetermined rotational torque to the rotational movement between the chassis members 12A and 12B are also provided in the hinge main body 20. A rear cover component 26 serving as a decorative cover is attached to an outer surface of the hinge main body 20 (see FIG. 1).

The support plates 22A and 22B are plates that are formed of a metal material such as aluminum, extend in the Y direction, and have bilaterally symmetrical shapes. The support plates 22A and 22B are pivotally supported with respect to brackets, on which the link arms 24A are 24B are pivotally supported, thereby being swingable. The support plates 22A and 22B are disposed on the left and right sides of the hinge main body 20 in the 180-degree posture, and their front surfaces are disposed on the same plane as the front surface of the hinge main body 20. As a result, the hinge device 14 is capable of supporting a folding region R3 (see FIG. 2) of the display laminate 18, which will be described later, in the 180-degree posture.

Next, a configuration of the display assembly 16 will be described.

Figure 4:
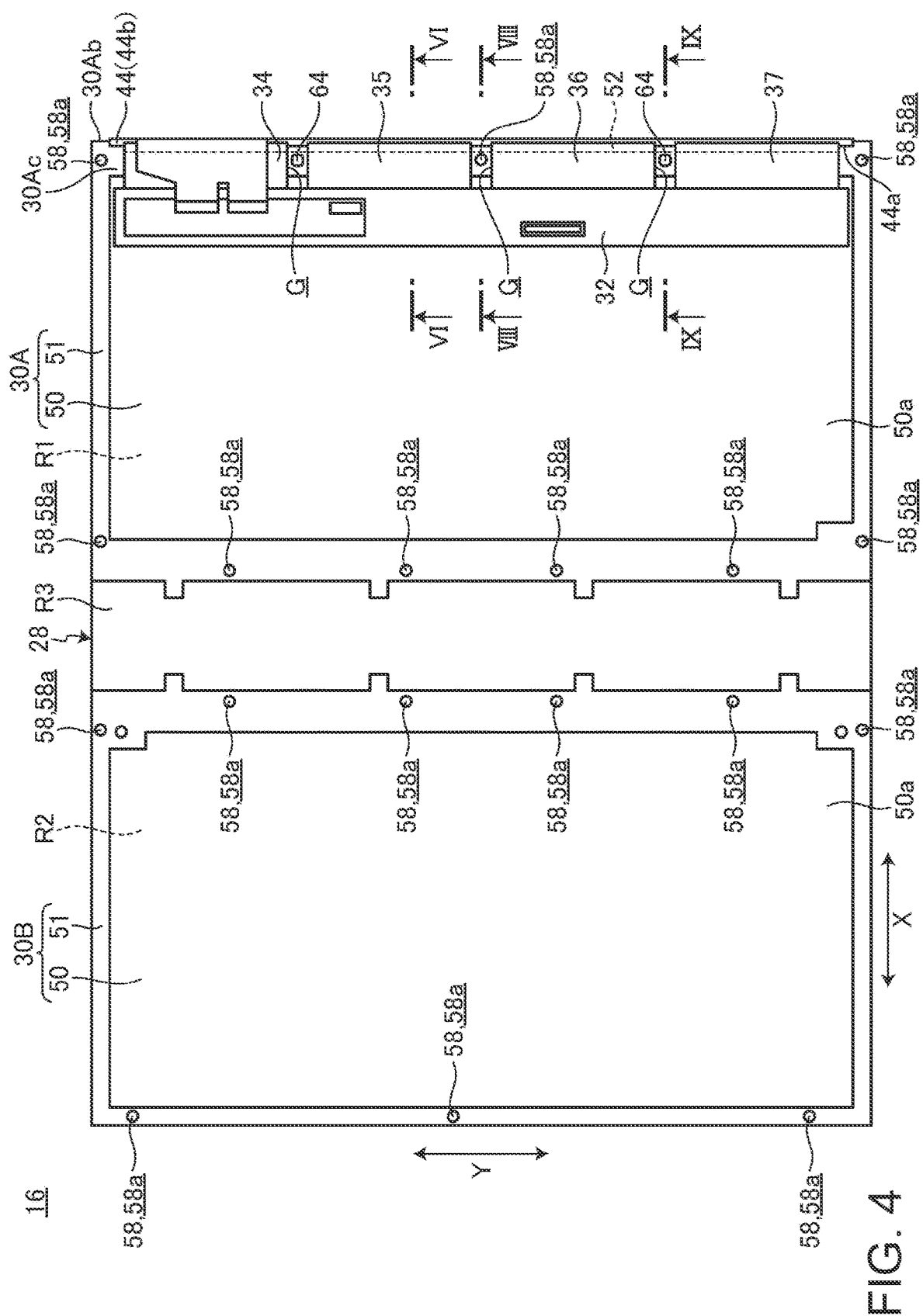
FIG. 4 is a schematic bottom view of the display assembly.
Figure 5:
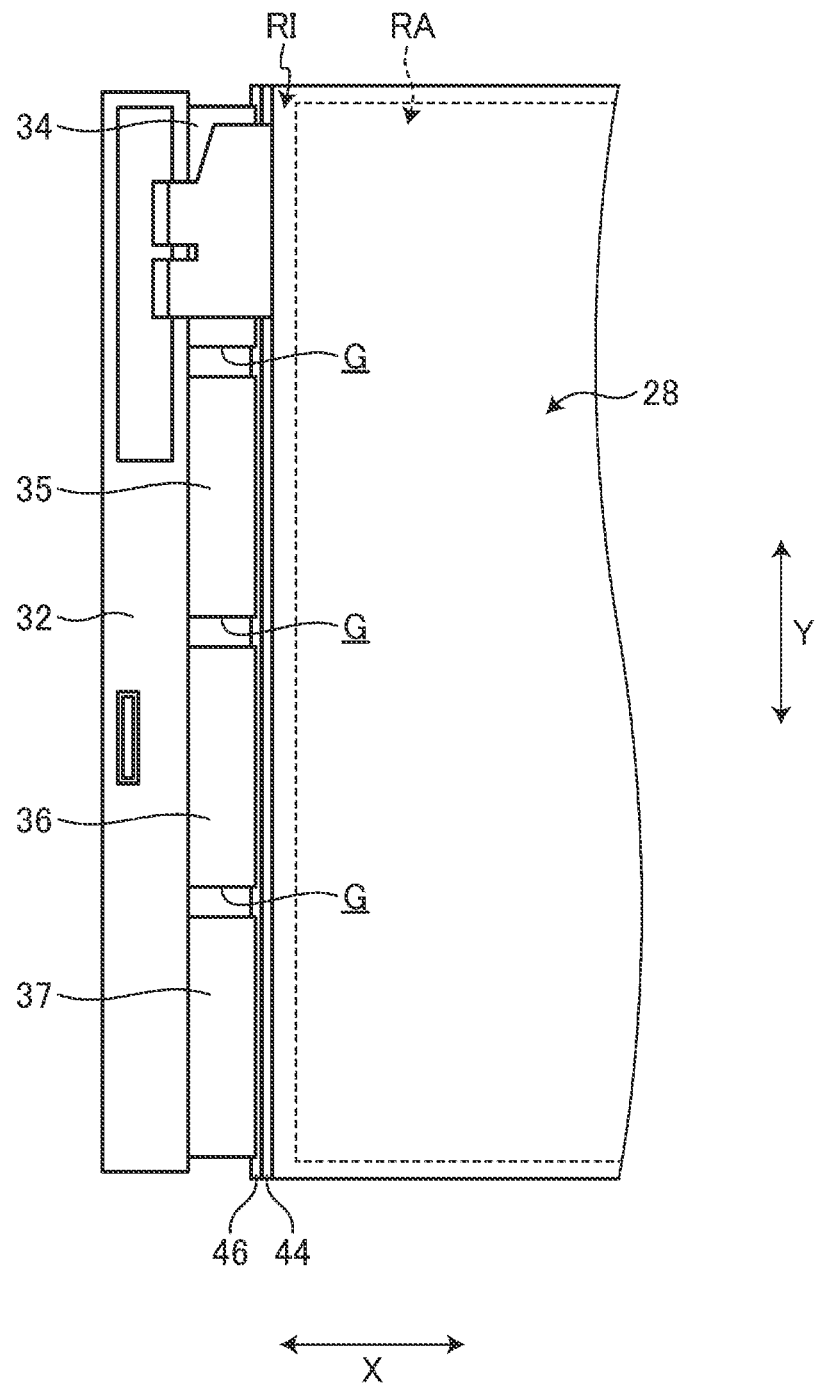
FIG. 5 is an enlarged plan view of a part of the display assembly illustrated in FIG. 4.
Figure 6:
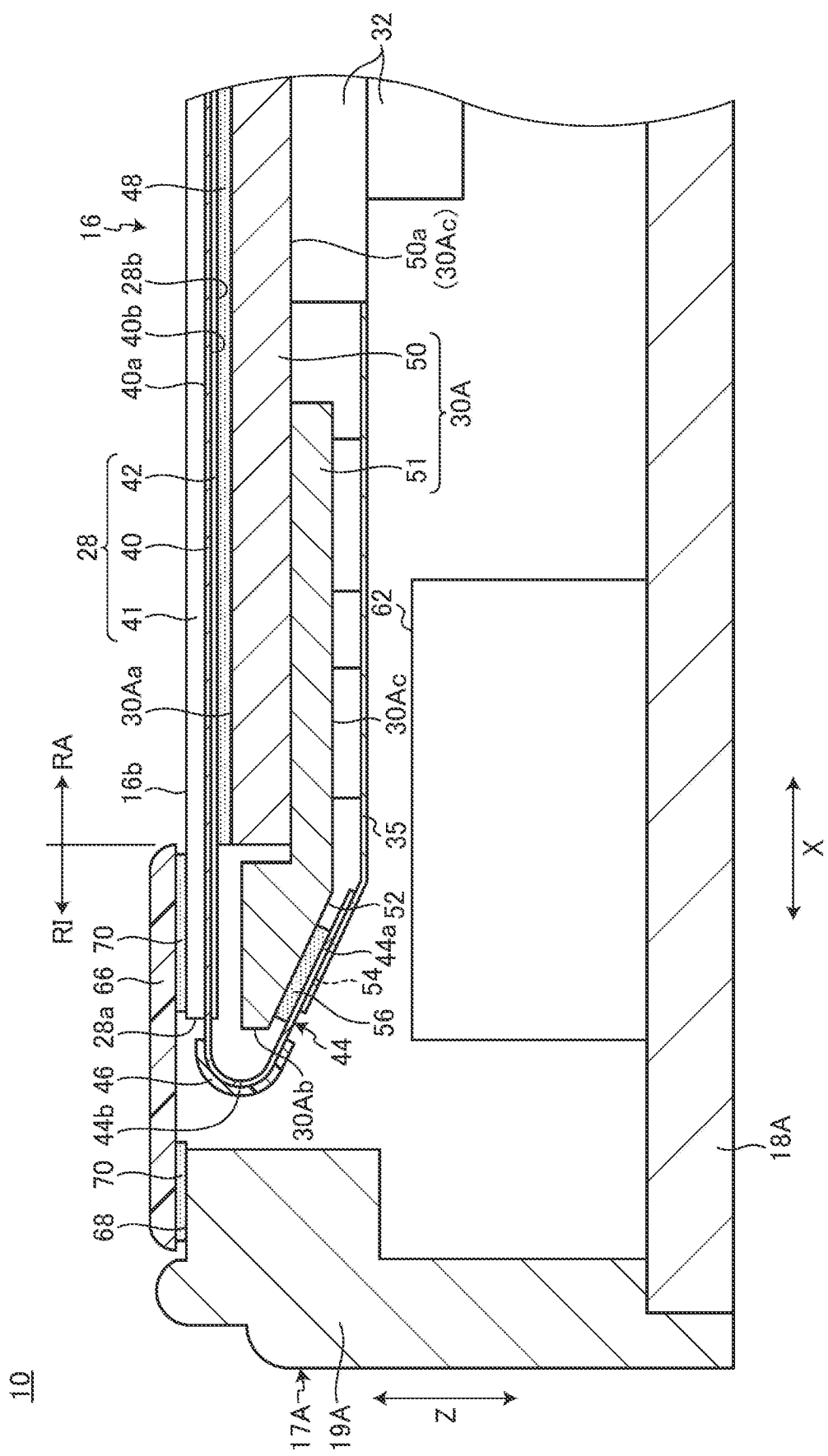
FIG. 6 is a schematic cross-sectional view taken along line VI-VI in FIG. 4.
Figure 7:
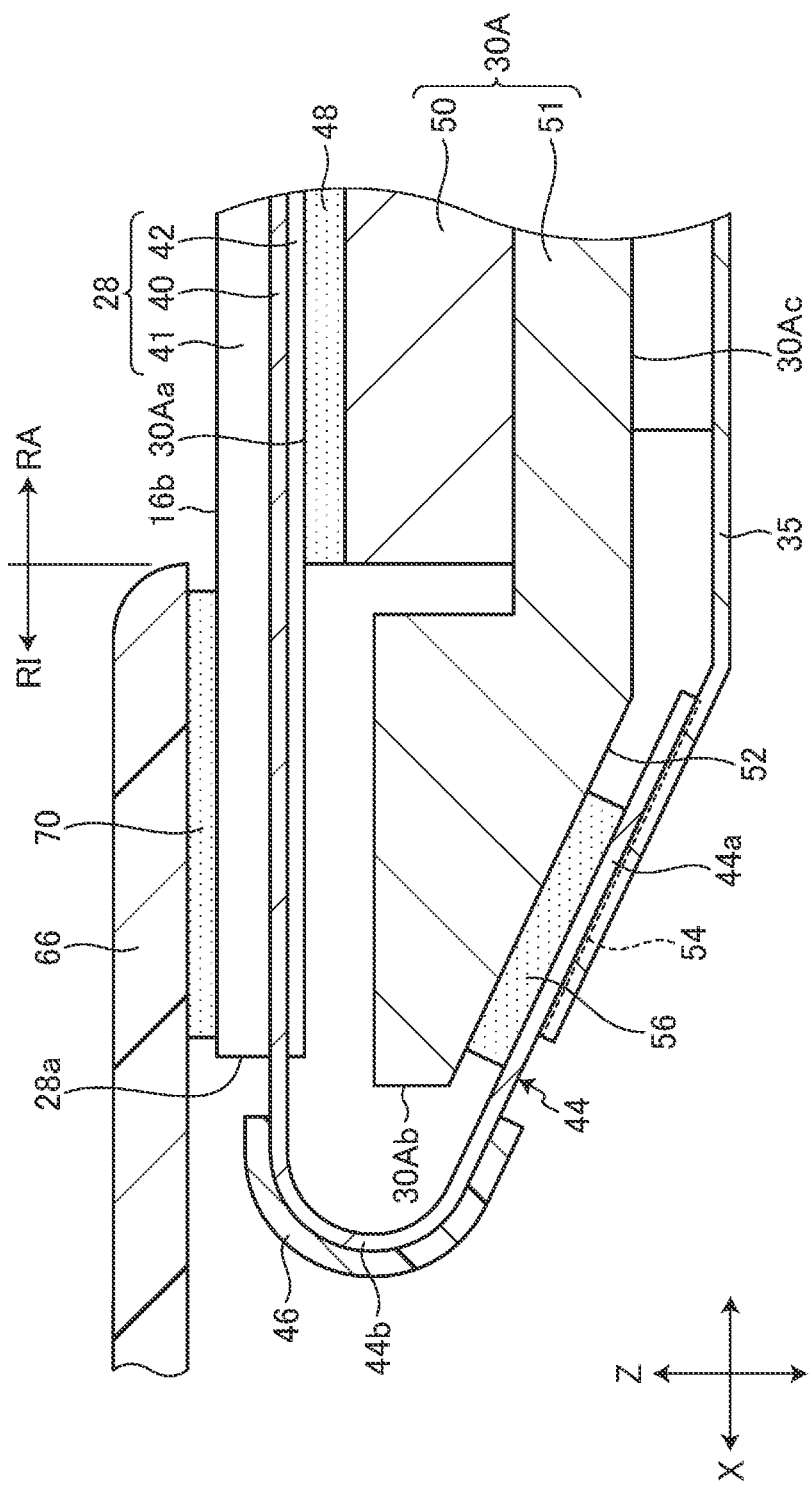
FIG. 7 is an enlarged side cross-sectional view of a main part of the display assembly illustrated in FIG. 6.
Figure 8:
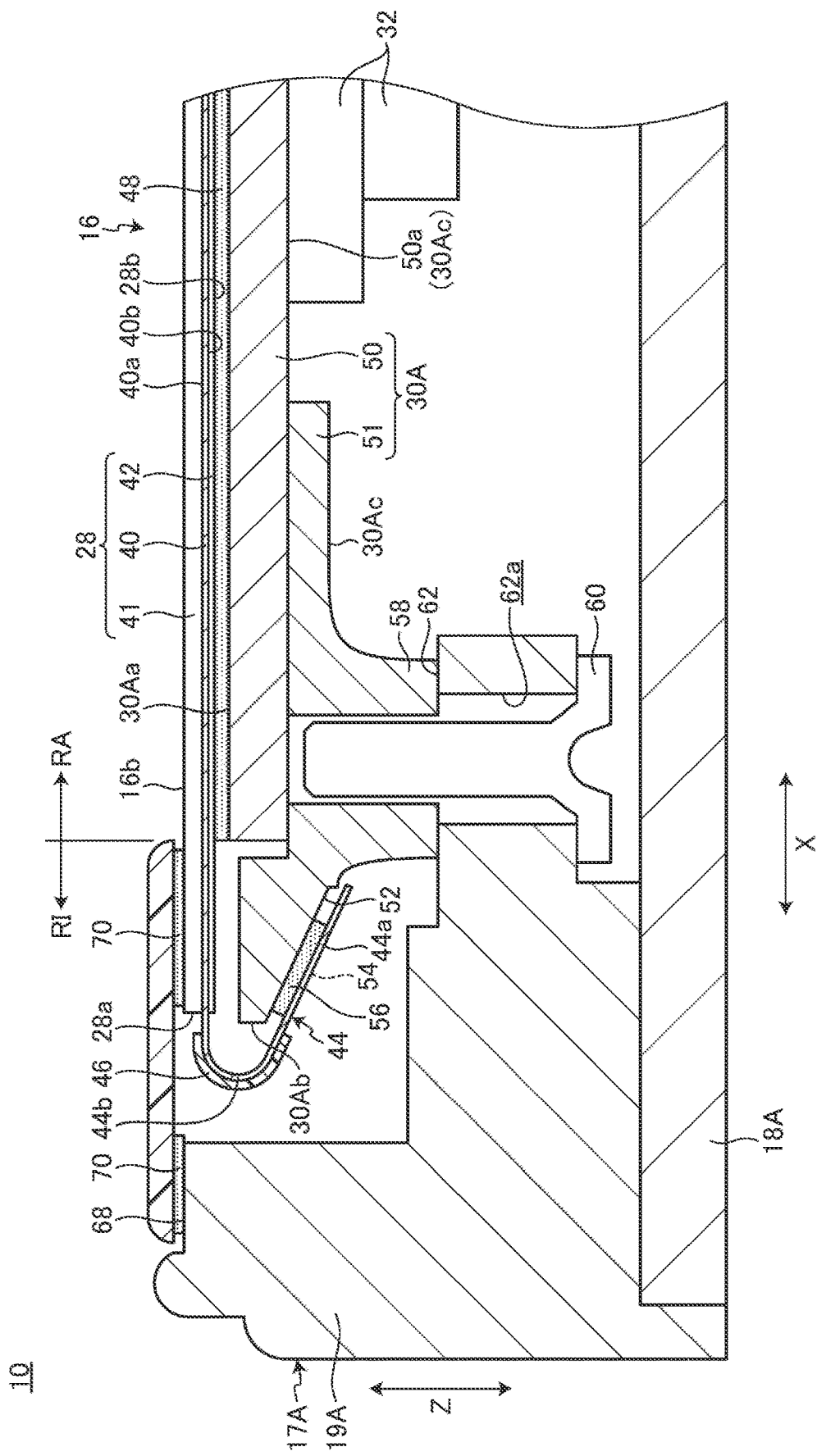
FIG. 8 is a schematic cross-sectional view along line VIII-VIII in FIG. 4.
Figure 9:
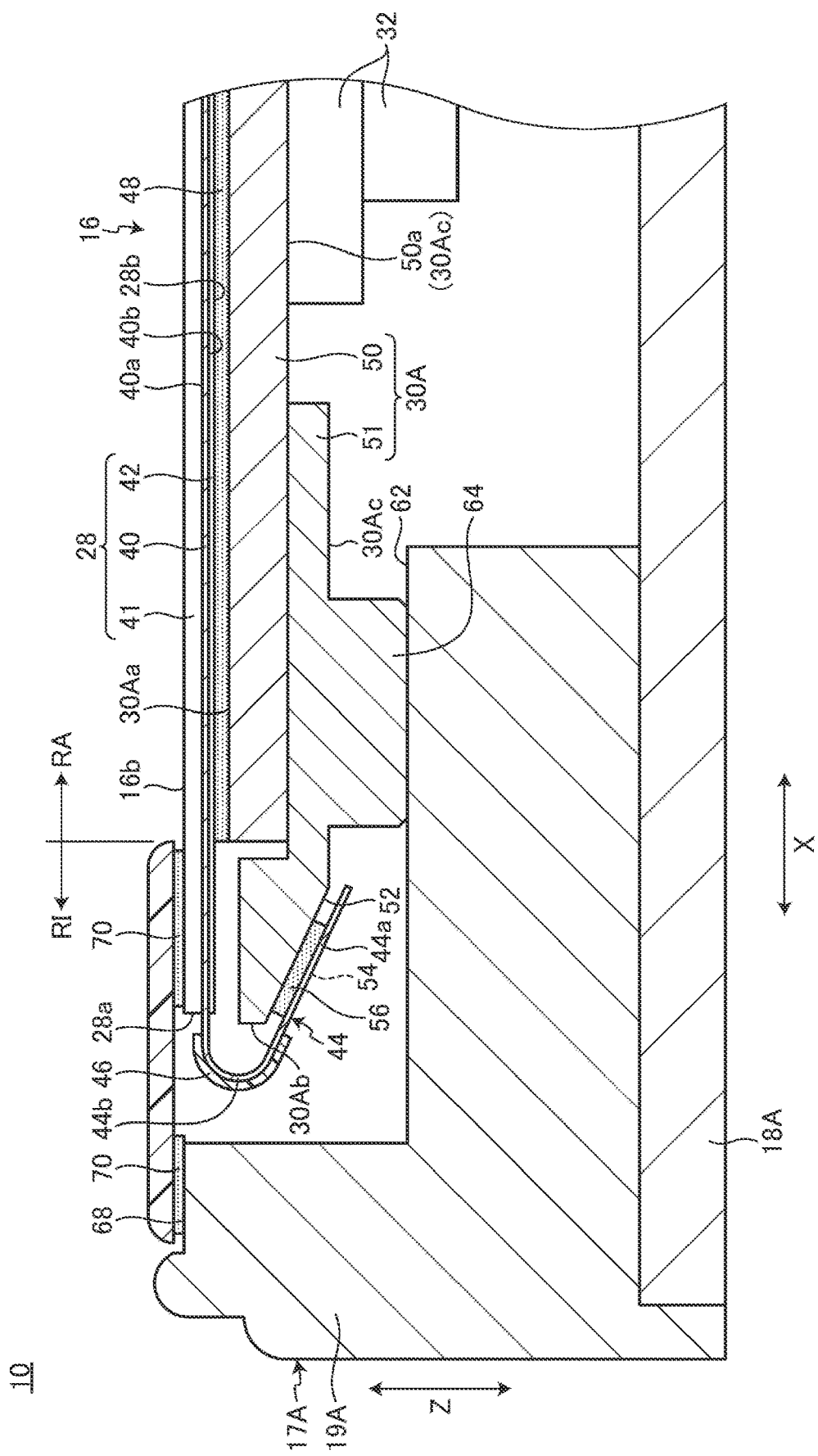
FIG. 9 is a schematic cross-sectional view along line IX-IX in FIG. 4.

FIG. 4 is a schematic bottom view of the display assembly 16. FIG. 5 is an enlarged plan view of a part of the display assembly 16 illustrated in FIG. 4. FIG. 5 illustrates a state before the control board 32 is fixed to the first plate 30A. FIGS. 6, 8, and 9 are schematic cross-sectional views taken along lines VI-VI, VIII-VIII, and IX-IX in FIG. 4, respectively. FIGS. 6 to 8 illustrate enlarged side cross-sectional views of a part of the electronic apparatus 10 in a state in which the display assembly 16 is attached to the chassis members 12A and 12B. FIG. 7 is an enlarged side cross-sectional view of a main part of the display assembly 16 illustrated in FIG. 6.

As illustrated in FIGS. 3 and 4, the display assembly 16 includes a display laminate 28, a first plate 30A, a second plate 30B, a control board 32, and wires 34 to 37.

The display laminate 28 is formed in a flexible sheet shape as a whole. In the 0-degree posture illustrated in FIG. 1, the chassis members 12A and 12B are in a state of being folded in half and laminated on each other. At this time, the display laminate 28 is in a state in which a first region R1 on the side of the first chassis member 12A and a second region R2 on the side of the second chassis member 12B, which are illustrated in FIG. 2, are disposed to face each other, and the folding region R3, which is a boundary region between the regions R1 and R2, is folded in an arc shape. In the 180-degree posture illustrated in FIGS. 2 and 3, the chassis members 12A and 12B are disposed side by side with each other. At this time, the display laminate 28 has the regions R1 and R2 and the folding region R3 disposed side by side on the XY plane, and forms a flat plate shape as a whole.

As illustrated in FIGS. 6 to 9, the display laminate 28 is obtained by laminating a display body 40, a front surface sheet 41, and a rear surface sheet 42.

The display body 40 is, for example, a Plastic Organic Electro-Luminescence Diode (POLED). The display body 40 includes an active region RA and a non-active region RI surrounding the active region RA (see FIGS. 5 and 6). The active region RA is a region for displaying an image, in which pixels disposed in a matrix shape are disposed. The non-active region RI is a region in which no image is displayed, and is provided so as to surround the active region RA. In the non-active region RI, for example, wires and terminals connected to the wires 34 to 37, a driving circuit, and the like are disposed.

The front surface sheet 41 is laminated on a front surface 40a of the display body 40. The front surface sheet 41 is, for example, a sheet in which a polarizing film is laminated under a functional film having an anti-glare function, an anti-reflection function, and an anti-fingerprint function. Although the display laminate 28 of one or more embodiments is of a touch panel type but may not be of the touch panel type.

A rear surface sheet 42 is laminated on a rear surface 40b of the display body 40. The rear surface sheet 42 is formed by forming a large number of hole portions in a metal sheet such as stainless steel. The rear surface sheet 42 has a certain degree of tension and is used to ensure the same radius of curvature as the design specifications when the display body 40 is folded. In FIGS. 6 to 9, cross-sectional hatching of the sheets 41 and 42 is omitted in order to ensure the visibility of the drawings.

As illustrated in FIGS. 4 to 7, the display body 40 has an extended portion 44 that extends a part of the non-active region RI and protrudes on the side rather than the sheets 41 and 42 laminated on the surfaces 40a and 40b. In an outer peripheral end surface of the display laminate 28, the extended portion 44 protrudes from an end surface 28a, which faces the standing wall 19A of the first frame member 17A standing upright along, for example, the Y direction.

An end portion 44a of the extended portion 44 is a part that is connected to the wires 34 to 37 and fixed to the first plate 30A. The extended portion 44 has a folded portion 44b that is folded back in an arc shape in the middle of the end portion 44a and the end surface 28a. A protective layer 46 for protecting the folded portion 44b is provided on the outer peripheral surface of the folded portion 44b. The protective layer 46 is, for example, an acrylic resin.

As illustrated in FIGS. 3 to 7, the plates 30A and 30B are disposed while interposing the hinge device 14 therebetween with a gap on the left and right, and the respective first surfaces 30Aa and 30Ba support the rear surface 28b of the display laminate 28. The rear surface 28b of the display laminate 28 has the first region R1 fixed to the first surface 30Aa of the first plate 30A and the second region R2 fixed to the first surface 30Ba of the second plate 30B. The regions R1 and R2 are fixed to the plates 30A and 30B using an adhesive material 48 such as double-sided tape (see FIG. 6). The first plate 30A is fastened to the first frame member 17A. The second plate 30B is fastened to the second frame member 17B.

The plates 30A and 30B are composed of a base plate 50 and a metal frame 51. The base plate 50 is, for example, a carbon fiber reinforced resin plate in which carbon fibers are impregnated with a matrix resin such as an epoxy resin. The metal frame 51 is formed of, for example, magnesium alloy or the like, and fixed to the outer peripheral edge portion of a rear surface 50a of the base plate 50. Since the plates 30A and 30B are carbon fiber reinforced resin plates, it is possible to ensure high flatness and to reduce the thickness and weight. However, the carbon fiber reinforced resin plate has a concern that the carbon fibers may come off from the outer peripheral end surface (edge) in powder shapes, and shape processing and screw processing are also difficult. Therefore, the plates 30A and 30B are fixed to the metal frame 51 with an adhesive or the like so as to surround an outer peripheral end surface of the base plate 50 and an outer edge portion of the rear surface 50a.

The first plate 30A has an inclined surface 52. The inclined surface 52 is formed at a corner portion between an end surface 30Ab corresponding to the end surface 28a of the display laminate 28 and a second surface 30Ac that is the rear surface of the first surface 30Aa which supports the display laminate 28. More specifically, the inclined surface 52 is a downwardly inclined surface that has a shape in which the edge between the end surface 30Ab and the second surface 30Ac is chamfered, and is gradually inclined downward from the end surface 30Ab toward the second surface 30Ac. In one or more embodiments, the inclined surface 52 is formed on a part of the metal frame 51 that protrudes outward from the base plate 50.

The base plate 50 may be formed of a metal material or a resin material instead of the carbon fiber reinforced resin plate. In this case, the metal frame 51 may be omitted, and the inclined surface 52, and a protruding portion 58 and a leg portion 64, which will be described later, may be provided on the base plate 50.

The control board 32 is a printed board for performing display control on the display body 40, and various semiconductor chips are mounted thereon. As illustrated in FIGS. 4 to 6, the control board 32 is fixed to the second surface 30Ac of the first plate 30A. As illustrated in FIG. 6, the control board 32 of one or more embodiments is fixed to the rear surface 50a of the base plate 50 in the second surface 30Ac, but a part or all of the rear surface 50a may be fixed to the metal frame 51. The control board 32 is connected to the motherboard mounted inside the first chassis member 12A or the second chassis member 12B using flexible boards or the like.

As illustrated in FIGS. 4 to 7, the wires 34 to 37 are configured by the flexible boards (Flexible Printed Circuit (FPC)), respectively, and connect the display body 40 and the control board 32. The wires 34 to 37 are arranged along the Y direction, which is the width direction of the extended portion 44 of the display body 40, with a gap G therebetween.

The wires 34 to 37 are connected to the end portion 44a of the extended portion 44 with respect to the display body 40. A connecting portion 54 between the wires 34 to 37 and the display body 40 is configured by electrical connection processing using, for example, an Anisotropic Conductive Film (ACF), so-called ACF bonding. The wires 34 to 37 are disposed so as to be hidden on a side of the second surface 30Ac of the first plate 30A by being connected to the end portion 44a at a tip of the folded portion 44b.

As illustrated in FIGS. 6 and 7, the connecting portion 54 is fixed to the inclined surface 52 of the first plate 30A using an adhesive material 56. In one or more embodiments, the end portion 44a of the extended portion 44 is fixed to the inclined surface 52 using the adhesive material 56, so that the connecting portion 54 is fixed to the inclined surface 52.

As illustrated in FIGS. 4 and 8, the second surface 30Ac of the first plate 30A is formed with a plurality of protruding portions 58 aligned along an outer periphery of the first plate 30A. The protruding portion 58 is formed on the metal frame 51 of the first plate 30A to protrude from the second surface 30Ac, and has, for example, a truncated cone shape. Each protruding portion 58 is provided with a screw hole 58a having a female screw formed on the inner peripheral surface thereof. A screw 60 is screwed into the screw hole 58a (see FIG. 8). The protruding portion 58 is provided on the second plate 30B similar to the first plate 30A. Each of the frame members 17A and 17B has a support surface 62 through which a hole portion 62a is formed to penetrate at a position overlapping each protruding portion 58 (see FIG. 8). The screw 60 is screwed into the screw hole 58a through the hole portion 62a. As a result, each protruding portion 58 is fastened to the frame members 17A and 17B, and the plates 30A and 30B are fixed to the frame members 17A and 17B, respectively.

As illustrated in FIG. 4, the protruding portion 58 may also be disposed at the gap G between the wires 35 and 36. As illustrated in FIG. 8, the protruding portion 58 stands upright through the gap G between the adjacent wires 35 and 36, and is fastened with respect to the support surface 62 of the first frame member 17A using the screw 60. As a result, as illustrated in FIG. 4, a part along the end surface 30Ab of the first plate 30A, is fastened to the protruding portions 58 and 58 at both ends in the Y direction and the protruding portion 58 provided at the gap G substantially in the center in the Y direction, that is three spots.

As illustrated in FIGS. 4 and 9, a leg portion 64 are also provided on the second surface 30Ac of the first plate 30A. The leg portion 64 is formed on the metal frame 51 of the first plate 30A to protrude from the second surface 30Ac, and has, for example, a truncated pyramid shape. For example, a pair of leg portions 64 are provided. One leg portion 64 stands upright through the gap G between the wires 34 and 35. The other leg portion 64 stands upright through the gap G between the wires 36 and 37. That is, the leg portion 64 is disposed in a gap G different from the gap G between the wires 35 and 36 in which the protruding portion 58 is disposed. As a result, the first plate 30A is supported by the support surface 62 using the leg portions 64 at the portions overlapping the remaining two gaps G where the wires 34 to 37 are not installed and the protruding portions 58 are not disposed.

As a result, the display assembly 16 is supported by the frame members 17A and 17B via the plates 30A and 30B. Here, as illustrated in FIGS. 2 and 3, the electronic apparatus 10 of one or more embodiments includes a bezel member 66 surrounding the outer peripheral edge portion of a front surface 16b of the display assembly 16.

As illustrated in FIGS. 6 to 9, the bezel member 66 is provided so as to straddle between the standing walls 19A and 19B that stand upright on the side of the display assembly 16 and the front surface 16b of the display assembly 16, and covers the gap therebetween. The bezel member 66 is fixed to the upper end surfaces 68 of the standing walls 19A and 19B and the front surface 16b with an adhesive material 70, respectively. The adhesive material 70 is, for example, double-sided tape. The bezel member 66 adheres to the front surface 16b of the front surface sheet 41 located in the non-active region RI with respect to the display assembly 16.

As described above, the display assembly 16 of one or more embodiments includes the display body 40, the first plate 30A that is disposed on the side of the rear surface 28b of the display body 40 and supports the display body 40 on the first surface 30Aa, the control board 32 that performs the display control on the display body 40, and the wires 34 to 37 that connect the display body 40 and the control board 32. The display body 40 includes the extended portion 44 that extends a part of the non-active region RI, the folded portion 44b that is provided in the middle of the extended portion 44 and folded back so as to wrap around the end surface 30Ab of the first plate 30A. Further, the wires 34 to 37 are connected to the end portion 44a of the extended portion 44, so that the connecting portion 54 between the extended portion 44 and the wires 34 to 37 is disposed on the side of the second surface 30Ac of the first plate 30A.

As described above, the display assembly 16 and the electronic apparatus 10 having the display assembly 16 are provided with the folded portion 44b in the extended portion 44 in which a part of the non-active region RI of the display body 40 extends to wrap around the side portion of the first plate 30A. As a result, the display assembly 16 is capable of avoiding disposing the entire non-active region RI on side of the front surface 16b, and furthermore avoiding disposing the connecting portion 54 between the display body 40 and the wires 34 to 37 on the front surface 16b. As a result, the display assembly 16 and the electronic apparatus 10 are capable of suppressing the width dimension of the bezel member 66 fixed to the front surface 16b of the display assembly 16, and are capable of improving the appearance quality.

Moreover, in the electronic apparatus 10, the wires 34 to 37 are connected to the end portion 44a of the extended portion 44 having the folded portion 44b, and the connecting portion 54 between the end portion 44a and the folded portion 44b is disposed on the side of the second surface 30Ac of the first plate 30A. As a result, the bezel member 66 is capable of adhering to the front surface 16b of the display assembly 16 without adhering to the connecting portion 54. Therefore, in the electronic apparatus 10, when the display assembly 16 is removed for maintenance, for example, even when the adhesive material 70 of the bezel member 66 is peeled off, the connecting portion 54 is not destroyed, and the workability of maintenance is excellent. Further, in the electronic apparatus 10, it is possible to reuse the display assembly 16 from which the bezel member 66 is removed after maintenance, and it is possible to reduce component replacement cost.

In one or more embodiments, the first plate 30A is directly fixed to the rear surface sheet 42 laminated on the rear surface 40b of the display body 40, and indirectly supports the display body 40. However, for example, a configuration may be provided in which the rear surface sheet 42 is omitted, and, in this case, the display body 40 may be directly fixed to the first plate 30A.

The first plate 30A has a chamfered inclined surface 52 formed at the corner portion between the end surface 30Ab and the second surface 30Ac. The end portion 44a of the extended portion 44 and the connecting portion 54 are fixed to the inclined surface 52. Therefore, as is clear from FIGS. 6 to 9, the display body 40 is capable of smoothly disposing the end portion 44a and the connecting portion 54 on the side of the second surface 30Ac of the first plate 30A without excessively reducing the radius of curvature of the folded portion 44b. For this reason, the display assembly 16 is capable of suppressing the load on the folded portion 44b where the display body 40 is folded to be minimized, so that it is possible to further suppress the occurrence of disconnection at the part. The inclined surface 52 may be omitted. That is, the connecting portion 54 does not necessarily need to be fixed to the inclined surface 52.

Further, the display assembly 16 also has a control board 32 fixed to the second surface 30Ac of the first plate 30A. For this reason, the entire display assembly 16 including the control board 32 is integrated. As a result, when mounting the display assembly 16 on the electronic apparatus 10, an assembly work is completed simply by fixing the plates 30A and 30B to the chassis members 12A and 12B and connecting the control board 32 to the motherboard, so that work efficiency is improved.

The second surface 30Ac of the first plate 30A is provided with the protruding portions 58 that stand upright through the gaps G between the wires 34 to 37 configured by the flexible boards and are fixed to the support surface 62 of the first chassis member 12A. For this reason, in the first plate 30A, a part near the end surface 30Ab of the second surface 30Ac, that is, most of the inclined surface 52 is blocked by the wires 34 to 37. However, it is possible to securely fix the part to the first chassis member 12A, so that it is possible to suppress the occurrence of rattling and floating.

Furthermore, the second surface 30Ac of the first plate 30A is provided with the leg portion 64 that stands upright through the gap G different from the gaps G in which the protruding portions 58 are provided among the plurality of gaps G and that is in contact with the support surface 62. For this reason, in the first plate 30A, it is also possible to prevent the remaining gaps G in which the wires 34 to 37 and the protruding portions 58 are not disposed from being a fluffy support state. Although the protruding portion 58 may be provided instead of the leg portion 64, in this case, the number of screws 60 to be fastened to the first plate 30A becomes excessive. Therefore, in consideration of the number of components, workability, weight, and the like, a configuration in which the leg portion 64 is provided may be appropriate for one or more embodiments.

The present invention is not limited to the above-described embodiments, and modification is freely possible without departing from the gist of the present invention.

In the above description, the extending portion 44 exemplifies a configuration in which the connecting portion 54 is disposed on the side of the second surface 30Ac which is the rear surface of the first plate 30A by wrapping around the end surface 30Ab of the first plate 30A. However, the extended portion 44 may be provided on the side of second plate 30B. In this case, the inclined surface 52, the protruding portion 58, and the leg portion 64 may be provided on an end surface of the second plate 30B on a side opposite to the edge portions 17Aa and 17Ba, and on the periphery of the end surface.

In the above, the electronic apparatus 10 that is capable of being folded in half like a book is exemplified. It is possible to apply the present invention to, in addition to a configuration of folding the same-shaped chassis members in half, for example, various configurations, such as a double-door configuration in which small chassis members are foldably connected to the left and right edge portions of a large chassis member, an S-shaped folding configuration in which chassis members with different folding directions are connected to the left and right edge portions of one chassis member, and a J-shaped folding configuration in which a small chassis member is foldably connected to one of the left and right edge portions of a large chassis member, and the number of chassis members to be connected may be four or more. Further, it is possible to apply the present invention to an electronic apparatus having, for example, a single plate chassis structure other than such a folding type structure. In this case, a configuration may be provided in which the rear surface of the display laminate is fixed to one plate.

DESCRIPTION OF SYMBOLS 10 electronic apparatus
12A first chassis member
12B second chassis member
14 hinge device
16 display assembly
28 display laminate
30A first plate
32 control board
34~37 wire
40 display body
44 extended portion
44b folded portion
52 inclined surface
54 connecting portion
58 protruding portion
64 leg portion
66 bezel member

What is claimed is:

1. A display assembly comprising:
a display body that is formed in a flexible sheet shape, and includes an active region and a non-active region;
a plate that is disposed on a side of a rear surface of the display body, and supports the display body on a first surface;
a control board that performs display control of the display body; and
a wire that connects the display body and the control board, wherein
the display body has an extended portion that extends from a part of the non-active region, and a folded portion that is provided in a middle of the extended portion and folded back so as to wrap around an end surface of the plate, and
the wire is connected to an end portion of the extended portion so that a connecting portion between the extended portion and the wire is disposed on a side of a second surface of the plate, wherein
the plate has a chamfered inclined surface formed at a corner portion between the end surface and the second surface, and
the connecting portion is fixed to the inclined surface.

2. The display assembly according to claim 1, wherein
the plate has a chamfered inclined surface formed at a corner portion between the end surface and the second surface, and
the display body has the end portion of the extended portion that is fixed to the inclined surface.

3. The display assembly according to claim 1, wherein
the control board is supported on the second surface of the plate.

4. The display assembly according to claim 1, wherein
the wire is configured with a plurality of flexible boards aligned along a width direction of the extended portion, and
each connecting portion between each flexible board and the extended portion is disposed on the side of the second surface of the plate.

5. An electronic apparatus comprising:
a chassis member;
a display assembly supported by the chassis member, wherein
the display assembly includes
a display body that is formed in a flexible sheet shape, and includes an active region and a non-active region,
a plate that is disposed on a side of a rear surface of the display body by being fixed to the chassis member, and supports the display body on a first surface,
a control board that performs display control of the display body, and
a wire that connects the display body and the control board,
the display body has an extended portion that extends from a part of the non-active region, and a folded portion that is provided in a middle of the extended portion and folded back so as to wrap around an end surface of the plate,
the wire is connected to an end portion of the extended portion so that a connecting portion between the extended portion and the wire is disposed on a side of a second surface of the plate, the wire is configured by a plurality of flexible boards aligned side by side with a gap along a width direction of the extended portion of the display assembly, the chassis member has a support surface that faces the second surface of the plate, and the second surface of the plate is provided with a protruding portion that stands upright through the gap, and fixed to the support surface.

6. The electronic apparatus according to claim 5, wherein the chassis member has a standing wall that stands upright on a side of the display assembly, and a rear surface plate that is disposed on a side of a rear surface of the plate, the display assembly has a front surface sheet that is laminated on a front surface of the display body, and the electronic apparatus further includes a bezel member that is provided so as to straddle between the standing wall and the display assembly, and adhesively fixed to the standing wall and the front surface sheet.

7. The electronic apparatus according to claim 5, wherein a plurality of the gaps are provided by providing three or more flexible boards, and the second surface of the plate is further provided with a leg portion that stands upright through a gap different from the gap provided with the protruding portion among the plurality of the gaps, and contacts the support surface.

8. The electronic apparatus according to claim 5, wherein the chassis member has a first chassis member, and a second chassis member adjacent to the first chassis member, the plate has a first plate that is supported by the first chassis member, and a second plate that is supported by the second chassis member, the electronic apparatus further includes a hinge device that relatively rotatably connects the first chassis member and the second chassis member between a first posture in which the first chassis member and the second chassis member are laminated so as to overlap each other in a surface normal direction and a second posture in which the first chassis member and the second chassis member are aligned to each other in a direction perpendicular to the surface normal direction, and the display body extends over the first plate and the second plate, and the folded portion is provided so as to wrap around an end surface of the first plate or the second plate.

9. A display assembly comprising:

a display body that is formed in a flexible sheet shape, and includes an active region and a non-active region;

a plate that is disposed on a side of a rear surface of the display body, and supports the display body on a first surface;

a control board that performs display control of the display body; and a wire that connects the display body and the control board, wherein the display body has an extended portion that extends from a part of the non-active region, and a folded portion that is provided in a middle of the extended portion and folded back so as to wrap around an end surface of the plate, and the wire is connected to an end portion of the extended portion so that a connecting portion between the extended portion and the wire is disposed on a side of a second surface of the plate, wherein the plate has a chamfered inclined surface formed at a corner portion between the end surface and the second surface, and the display body has the end portion of the extended portion that is fixed to the inclined surface.

* * * * *